(12) United States Patent
Fradkin et al.

(10) Patent No.: US 10,803,366 B2
(45) Date of Patent: Oct. 13, 2020

(54) METHOD FOR EXTRACTING AN OUTPUT DATA SET

(71) Applicants: SIEMENS AKTIENGESELLSCHAFT, Munich (DE); SIEMENS CORPORATION, Orlando, FL (US)

(72) Inventors: Dmitriy Fradkin, Wayne, PA (US); Volkmar Sterzing, Neubiberg (DE); Stefan Langer, Munich (DE)

(73) Assignees: SIEMENS AKTIENGESELLSCHAFT, Munich (DE); SIEMENS CORPORATION, Orlando, FL (US)

(*) Notice: Subject to any disclaimer, the term of this patent is extended or adjusted under 35 U.S.C. 154(b) by 147 days.

(21) Appl. No.: 15/981,952

(22) Filed: May 17, 2018

(65) Prior Publication Data
US 2019/0354819 A1   Nov. 21, 2019

(51) Int. Cl.
G06K 9/78    (2006.01)
G06K 9/62    (2006.01)
G06K 9/20    (2006.01)
G06F 40/295  (2020.01)

(52) U.S. Cl.
CPC .............. *G06K 9/78* (2013.01); *G06F 40/295* (2020.01); *G06K 9/20* (2013.01); *G06K 9/6201* (2013.01)

(58) Field of Classification Search
CPC .......... G06K 9/78; G06K 9/20; G06K 9/6201; G06F 17/278
USPC ................................................... 382/100, 155
See application file for complete search history.

(56) References Cited

U.S. PATENT DOCUMENTS

| 9,558,411 | B1* | 1/2017 | Ferguson | G06K 9/00818 |
| 2016/0026899 | A1* | 1/2016 | Wang | G06K 9/72 |
| | | | | 382/176 |
| 2018/0061256 | A1* | 3/2018 | Elchik | G06F 17/2229 |
| 2019/0156544 | A1* | 5/2019 | Tsuboi | G06F 17/2276 |

* cited by examiner

*Primary Examiner* — Ayodeji O Ayotunde
(74) *Attorney, Agent, or Firm* — Schmeiser, Olsen & Watts LLP

(57) ABSTRACT

The present invention relates to a method for extracting an output data set, wherein the method includes the following steps receiving an input data set; wherein the input data set comprises at least one textual input data set and at least one visual input data set; processing the at least one textual input data set using natural language processing into at least one textual output data set; processing the at least one visual input data set using image processing into at least one visual output data set, and outputting the output data set, including the at least one textual output data set and/or the at least one visual output data set. Further, the present invention is related to a computer program product and system.

12 Claims, 2 Drawing Sheets

METHOD FOR EXTRACTING AN OUTPUT DATA SET

1. TECHNICAL FIELD

The present invention relates to a computer-implemented method for extracting an output data set, a corresponding system and computer program product. The technical field of the invention is data analysis or data processing.

2. BACKGROUND

The volume or amount of data is still increasing until now. The data can include human- and machine-generated data. This large or voluminous data is known under the terms "big data" or "large scale data". Especially, the digital data will substantially grow in the next years in view of the digital transformation.

Thus, the importance of automated large scale data analysis or data processing will accordingly increase in the future since the manual analysis becomes unfeasible for the experts. This analysis or processing paradigm encompasses a series of different methods and systems to process big data. Big data challenges include in particular capturing data, data storage, data analysis, search, sharing, transfer, visualization, querying, updating, information privacy and data source.

For example, gas turbines are complex systems with a lot of components which are monitored by various sensors. Service engineers or other technical experts use the sensor signals in addition to visual inspection to determine the condition of a turbine. Then, they can determine necessary actions from their findings. The inspection is a very time-consuming and complex process since the engineers need to consider a lot of different sensor signals with the visual inspection results in order to reliably assess the health state of a turbine.

Usually, the inspection results are incorporated in a written report or other document. The document does not solely comprise text, but also contains pictures of the inspected parts. In other words, the resulting document contains textual and visual data. In addition to the written report of the inspection, additional written materials such as handbooks and material lists are usually available.

According to prior art, users or experts reading the resulting documents have to extract the relevant information from the documents and to enter the extracted information into a database or other storage device. However, this manual approach is time consuming and expensive. The traditional data processing application software cannot process the input data with textual data from various sources and the visual sections adequately.

It is therefore an objective of the invention to provide a method for extracting an output data set in an efficient and reliable manner and which can be applied on big data with distinct data types.

3. SUMMARY

This problem is according to one aspect of the invention solved by a method for extracting an output data set, wherein the method comprises the following steps:
  a. Receiving an input data set; wherein
  b. the input data set comprises at least one textual input data set and at least one visual input data set;
  c. Processing the at least one textual input data set using natural language processing into at least one textual output data set;
  d. Processing the at least one visual input data set using image processing into at least one visual output data set, and
  e. Outputting the output data set, comprising the at least one textual output data set and/or the at least one visual output data set.

The invention is directed to a method for extracting an output data set. The term "extraction" can be equally referred to as gathering or acquiring. Accordingly, output data or information is extracted from input data. Examples of the input data include written reports, manuals, material lists, handbooks and any other documents.

Thereby, the input data set can be any kind of data or information. Importantly, the input data set comprises both textual data and visual data. The textual data can be equally referred to as text data, data in text format or language data. Examples include text passages of the aforementioned written reports, manuals, material lists and handbooks. To the contrary, the visual data can be equally referred to as optical data or graphical representations. Examples include figures, graphics, pictures, images or diagrams. Thus, the input data set comprises two distinct data types which are processed in a different way.

The textual input data set is processed via natural language processing (NLP) whereas the visual input data set is processed via image processing. Accordingly, two distinct approaches are used for processing the input data sets. Natural language processing (NLP) is an area of computer science and artificial intelligence concerned with the interactions between computers and human (natural) languages, in particular how to program computers to fruitfully process large amounts of natural language data.

The at least one textual output data set is the extracted or processed textual input data set. The at least one visual output data set is the extracted or processed visual input data set. The output data set can comprise one of the output data sets or a combination thereof. The output data set is outputted. For example, the output data set can be outputted to a user for manual inspection or analysis. Additionally or alternatively, the output data set can be further automatically analyzed or stored in a data base or other storage device.

The method according to the invention enables data processing of documents containing data of distinct data formats or types in a fully automated and efficient manner. No expert knowledge is required any more to process a large set of documents manually. Thus, the method advantageously has significant cost and time savings compared to prior art. Moreover, the resulting output data is more reliable compared to prior art because the output of the textual and visual processing steps is combined.

In one aspect at least one natural language processing method is applied on the at least one textual input data set in step c., wherein
the natural language processing method is selected from the group, comprising entity extraction, relation extraction or another approach. Accordingly, the textual input data set is processed via natural language processing. Thereby, any one of NLP algorithms can be used and chosen according to the conditions or needs. This allows for an increased flexibility.

In another aspect at least one image processing method is applied on the at least one visual input data set in step d., wherein the image processing method is in particular a deep learning approach. Accordingly, the textual input data set is processed via image processing. Thereby, any one of image processing algorithms can be used and chosen according to the conditions or needs. This allows for an increased flexibility. For example, Convolutional Neural Networks can be used as deep learning approach.

In another aspect the method further comprises the step of comparing the at least one textual output data set with the at least one visual output data set after step d., if the at least one textual output data set matches the at least one visual output data set at least in part, combining the at least one textual output data set with the at least one visual output data set into a combined output data set and outputting the combined data set as output data set in step e., if the at least one textual output data set does not match the at least one visual output data set at least in part, Outputting the at least one textual output data set or the at least one visual output data set as output data set in step e.

Accordingly, after processing, an intermediate step can be added. The textual output data set is compared with the visual output data set and checked for consistency. The two data sets are combined in the case of a complete or partial match. A partial match means that parts of the findings reported in a data set overlap. For example, with regard to the exemplary gas turbine the expression 'broken and distorted blades' overlaps partially with the expression 'broken and corroded blades'.

Otherwise, just one data set is outputted as output data set in the case of no complete or no partial match. Machine learning approaches associate a confidence level with a given data set. The data set with the higher confidence level is returned as output data set. Alternatively or additionally to machine learning, other approaches can be used. Thus, the two data sets have to overlap at least partly or have to be confirmed before being combined. This consistency check improves the reliability of the output data set and ensures that correct or accurate data is outputted and can be further used.

In another aspect the method further comprises the step of analyzing the combined output data set.

In another aspect the analysis comprises at least one of the following steps: comparing the combined output data set with further data and extending the combined output data set with further data.

In another aspect the further data is at least one further textual input data set and/or at least one further visual input data set.

Accordingly, the combined output data set can be further analyzed or processed. Further, consistency checks or other checks can be applied on the combined output data set. Additionally or alternatively, the combined output data set can be extended with data or adjusted. The data can comprise any kind of data format and can be processed via aforementioned approaches. Moreover, the combined output data set can also be visually displayed to a user or stored in a storage unit, as outlined before.

Further, the invention is directed to a computer program product directly loadable into internal memory of a computer, comprising software code portions for performing the steps of the aforementioned method when said computer program product is running on a computer.

Further, the invention is directed to a system for extracting an output data set, comprising:

a. means for receiving an input data set; wherein b. the input data set comprises at least one textual input data set and at least one visual input data set;

c. means for processing the at least one textual input data set using natural language processing into at least one textual output data set;

d. means for processing the at least one visual input data set using image processing into at least one visual output data set; and e. means for outputting the output data set, comprising the at least one textual output data set and/or the at least one visual output data set.

4. BRIEF DESCRIPTION OF THE DRAWINGS

In the following detailed description, presently preferred embodiments of the invention are further described with reference to the following figures.

5. DETAILED DESCRIPTION

Figure 1:
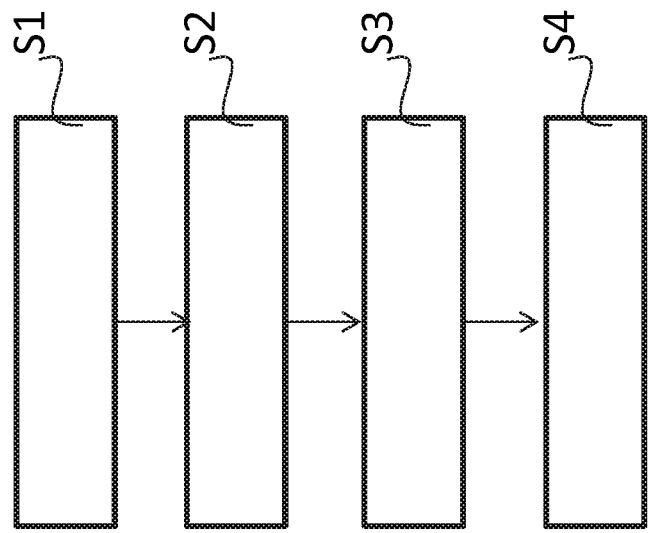
FIG. 1 shows a flow chart of the method steps according to embodiments of the invention.
Figure 2:
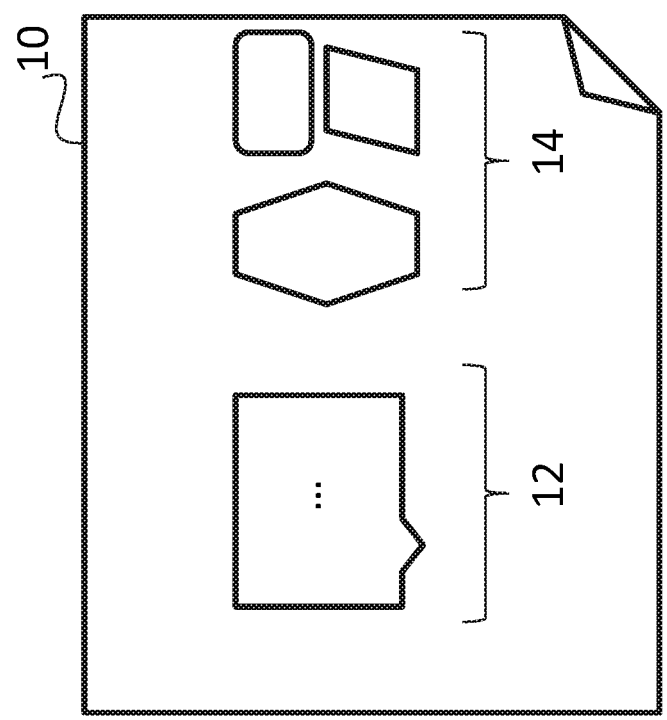
FIG. 2 shows an exemplary input data set according to embodiments of the invention.

FIG. 1 shows a flow chart of the method for extracting an output data set according to the invention, comprising the method steps S1 to S4.

First, an input data set 10 is received S1. The input data set 10 comprises both textual and visual input data sets 12, 14. Referring to the aforementioned example of a gas turbine, the input data set 10 can be an inspection result of a service engineer, such as the written report. The written report 10 comprises e.g. text passages 12 or written passages and e.g. figures or other diagrams 14.

Thereby, the textual input data set 12 is processed via natural language processing (NLP) in one processing step S2. Accordingly, NLP methods are used to extract e.g. references to the parts and conditions from the text surrounding the visual data, such as figure. Exemplary NLP methods include entity extraction, relation extraction using local grammars and other rule based systems and deep learning approaches for identifying relations and entities. The visual input data set 14 is processed via image processing in one processing step S3. The image processing can include deep learning to identify e.g. both turbine parts and conditions of those parts in figures included in the documents.

Further, the method can be trained on existing reports. Moreover, additionally or alternatively other documents, such as handbooks and material lists can be used as input data set for training.

Then, the output data set with the extracted textual data and/or the extracted visual data parts is outputted. This output data set is structured data or information and can e.g. provide a complete view of the health state of the aforementioned exemplary gas turbine. The output data set can also comprise images and text. The extracted textual data and the extracted visual data are similar or partially match and can be combined.

Accordingly, visual and textual information is taken into account according to the invention resulting in a more precise data analysis and in a more reliable output data set. The method ensures that solely correct output data is further processed or used.

Embodiments of the invention may also include a computer program product. The computer program product may comprise a computer readable hardware storage device having computer readable program code stored therein, the program code executable by a processor of a computer system to implement the methods described above.

The invention claimed is:

1. A method for extracting an output data set, wherein the method comprises the following steps:
   receiving an input data set; wherein the input data set comprises at least one textual input data set and at least one visual input data set;
   processing the at least one textual input data set, using natural language processing, into at least one textual output data set;
   processing the at least one visual input data set, using image processing, into at least one visual output data set;
   comparing the at least one textual output data set with the at least one visual output data set; and
   outputting the output data set, comprising at least one of the at least one textual output data set and the at least one visual output data set;
   wherein when the at least one textual output data set matches the at least one visual output data set at least in part, the at least one textual output data set is combined with the at least one visual output data set into a combined output data set and the combined output data set is outputted,
   further wherein when the at least one textual output data set does not match the at least one visual output data set at least in part, the at least one textual output data set or the at least one visual output data set is outputted as the output data set.

2. The method according to claim 1, wherein at least one natural language processing method is applied on the at least one textual input data set, wherein the natural language processing method is selected from the group, comprising entity extraction, relation extraction or another approach.

3. The method according to claim 1, wherein at least one image processing method is applied on the at least one visual input data set, wherein the image processing method is in particular a deep learning approach.

4. The method according to claim 1, wherein the method further comprises the step of analyzing the combined output data set.

5. The method according to claim 4, wherein the analysis comprises at least one of the following steps: comparing the combined output data set with further data and extending the combined output data set with further data.

6. The method according to claim 5, wherein the further data is at least one of at least one further textual input data set and at least one further visual input data set.

7. A computer program product, comprising a computer readable hardware storage device having computer readable program code stored therein, said program code executable by a processor of a computer system to implement a method according to claim 1.

8. A system for extracting an output data set, comprising:
   a means for receiving an input data set; wherein the input data set comprises at least one textual input data set and at least one visual input data set;
   a means for processing the at least one textual input data set using natural language processing, into at least one textual output data set;
   a means for processing the at least one visual input data set, using image processing, into at least one visual output data set;
   a means for comparing the at least one textual output data set with the at least one visual output data set; and
   a means for outputting the output data set, comprising at least one of the at least one textual output data set and the at least one visual output data set;
   wherein when the at least one textual output data set matches the at least one visual output data set at least in part, the at least one textual output data set is combined with the at least one visual output data set into a combined output data set and the combined output data set is outputted,
   further wherein when the at least one textual output data set does not match the at least one visual output data set at least in part, the at least one textual output data set or the at least one visual output data set is outputted as the output data set.

9. The system according to claim 8, wherein when the at least one textual output data set does not match the at least one visual output data set at least in part, the system associates a first confidence level with the textual output data set and a second confidence level with the visual output data set.

10. The system according to claim 9, wherein the system outputs the textual output data set when the first confidence level is higher than the second confidence level, and wherein the system outputs the visual output data set when the second confidence level is higher than the first confidence level.

11. The method according to claim 1, further comprising:
    assigning a first confidence level with the textual output data set and a second confidence level with the visual output data set when the at least one textual output data set does not match the at least one visual output data set at least in part.

12. The method according to claim 11, further comprising:
    outputting the textual output data set when the first confidence level is higher than the second confidence level, and
    outputting the visual output data set when the second confidence level is higher than the first confidence level.

* * * * *